(12) United States Patent
Mukai et al.

(10) Patent No.: US 9,197,818 B2
(45) Date of Patent: Nov. 24, 2015

(54) IMAGING APPARATUS

(71) Applicant: Panasonic Intellectual Property Corporation of America, Torrance, CA (US)

(72) Inventors: Tsutomu Mukai, Osaka (JP); Akio Nishiyama, Hyogo (JP); Jun Watanabe, Tokyo (JP); Yasutoshi Yamamoto, Osaka (JP)

(73) Assignee: Panasonic Intellectual Property Corporation of America, Torrance ( * ) Notice: Subject to any disclaimer, the term of this patent is extended or adjusted under 35 U.S.C. 154(b) by 605 days.

(21) Appl. No.: 13/682,828

(22) Filed: Nov. 21, 2012

(65) Prior Publication Data

US 2013/0120632 A1     May 16, 2013

Related U.S. Application Data

(63) Continuation of application No. 12/692,801, filed on Jan. 25, 2010, now Pat. No. 8,339,448.

(30) Foreign Application Priority Data

Jan. 26, 2009   (JP) ................... 2009-013998
Feb. 18, 2009   (JP) ................... 2009-034970

(51) Int. Cl.
    *H04N 7/18*       (2006.01)
    *H04N 5/232*      (2006.01)
    *H04N 1/00*       (2006.01)

(52) U.S. Cl.
    CPC ....... *H04N 5/23293* (2013.01); *H04N 1/00249* (2013.01); *H04N 7/18* (2013.01); *H04N 1/00267* (2013.01); *H04N 2201/0408* (2013.01)

(58) Field of Classification Search
    CPC .................. H04N 2201/0408; H04N 1/00249; H04N 1/00267; H04N 5/23; H04N 1/193
    USPC ...................................... 348/96–110
    See application file for complete search history.

(56) References Cited

U.S. PATENT DOCUMENTS

| | | | |
|---|---|---|---|
| 7,634,158 B2 | 12/2009 | Nakase et al. | 382/305 |
| 8,040,386 B2 | 10/2011 | Inamoto et al. | 348/222.1 |
| 2004/0008258 A1 | 1/2004 | Aas et al. | |
| 2007/0171296 A1 | 7/2007 | Tsukiji et al. | |
| 2008/0025710 A1 | 1/2008 | Sugimoto | |
| 2009/0135269 A1 | 5/2009 | Nozaki et al. | |
| 2010/0158491 A1 | 6/2010 | Sugimoto | |

FOREIGN PATENT DOCUMENTS

| | | |
|---|---|---|
| EP | 1737216 | 12/2006 |
| EP | 1962497 | 8/2008 |
| JP | 2004-062868 | 2/2004 |
| JP | 2007-006033 | 1/2007 |

(Continued)

*Primary Examiner* — Andy Rao
(74) *Attorney, Agent, or Firm* — Panasonic Patent Center

(57) ABSTRACT

An imaging apparatus includes a determining unit operable to determine whether a subject indicated by a feature quantity information extracted by an extracting unit is a same face indicated by a feature quantity information stored in a storing unit as the registration candidate, and a display unit operable to display a screen for prompting a user to perform an operation concerning registration in accordance with number of times the determining unit determines that the subject indicated by the feature quantity information extracted by the extracting unit is the same subject indicated by the feature quantity information stored in the storing unit as the registration candidate.

24 Claims, 8 Drawing Sheets

(56) References Cited

FOREIGN PATENT DOCUMENTS

| | | |
|---|---|---|
| JP | 2007-150601 | 6/2007 |
| JP | 2007-150602 | 6/2007 |
| JP | 2007-208355 A | 8/2007 |
| JP | 2008-054288 | 3/2008 |
| JP | 2008-141617 | 6/2008 |
| JP | 2008-252321 | 10/2008 |
| JP | 2008-270896 | 11/2008 |

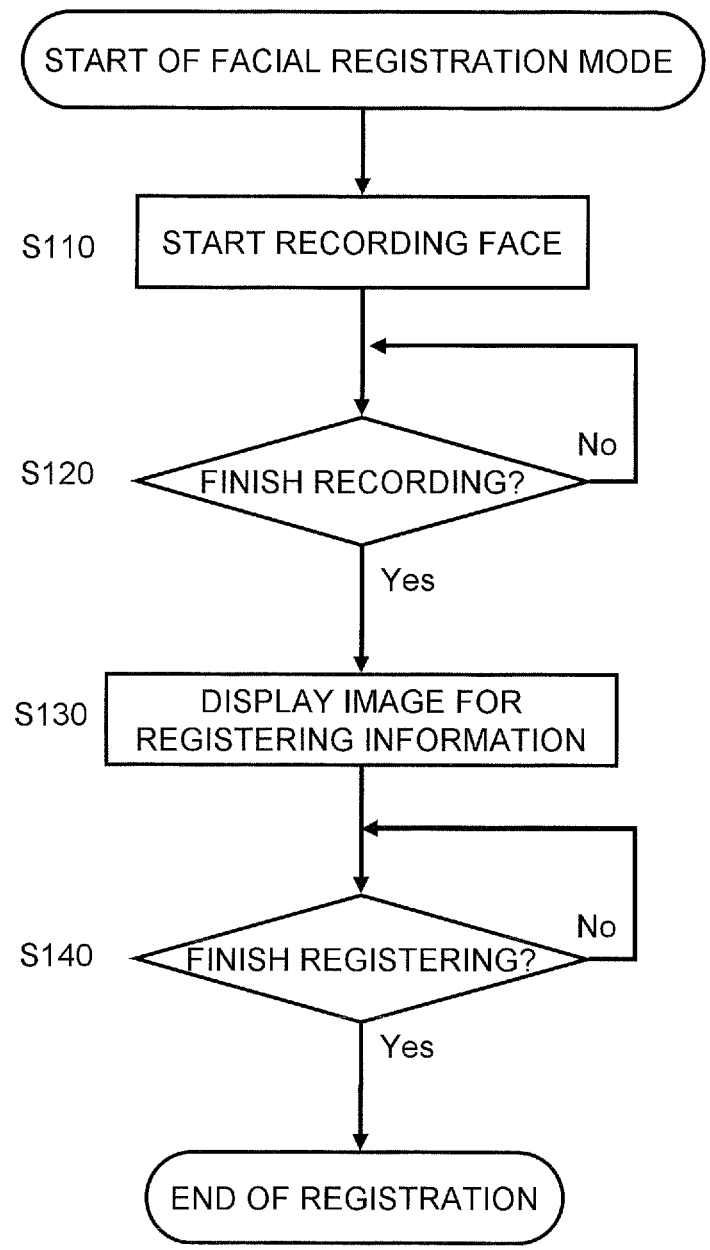

IMAGING APPARATUS

BACKGROUND ART

1. Technical Field

The technical field relates to an imaging apparatus, and more particularly, to an imaging apparatus having an identification function of a subject (for example, a face).

2. Related Art

JP-A2007-150601 discloses an electronic camera having a person's facial recognition function. The electronic camera includes a facial registration mode for capturing a person's face. The electronic camera captures a face in the facial registration mode, generates facial recognition data for recognizing the face, and registers the facial recognition data therein. The electronic camera searches for a registered face from subjects to be captured based on the registered facial recognition data.

According to the electronic camera disclosed in JPA-2007-150601, in order to register a face that is to be identified, it is necessary to select the facial registration mode and to capture and register the face. Therefore, whenever a face that is an identification target is registered, the face must be captured in the facial registration mode, and the operation is complicated.

SUMMARY

An object is to provide an imaging apparatus capable of registering a subject (for example, a face) that is an identification target more easily.

To solve the above problem, an imaging apparatus includes an imaging unit operable to capture a subject to generate image data, an extracting unit operable to extract feature quantity information indicative of a feature of the subject from the image data generated by the imaging unit, a storing unit operable to store the feature quantity information extracted by the extracting unit as a registration candidate, a determining unit operable to determine whether a subject indicated by the feature quantity information extracted by the extracting unit is a same subject indicated by the feature quantity information stored in the storing unit as the registration candidate, and a display unit operable to display an image for prompting a user to perform an operation concerning registration in accordance with number of times the determining unit determines that the subject indicated by the feature quantity information extracted by the extracting unit is the same subject indicated by the feature quantity information stored in the storing unit as the registration candidate.

The image for prompting the user to perform the operation concerning registration may be a image for allowing the user to select whether information indicating a subject that is determined a predetermined number of times to be the same subject indicated by the feature quantity information stored in the storing unit as the registration candidate should be registered.

The image for prompting the user to perform the operation concerning registration may be a image for allowing the user to input information concerning a subject that is determined a predetermined number of times to be the same subject indicated by the feature quantity information stored in the storing unit as the registration candidate.

In a case where the imaging unit can be set to a single shooting mode in which capturing operation is performed once and to a continuous shooting mode in which the capturing operation is performed a plurality of times, when the imaging unit is set to the single shooting mode, the display unit may display the image for prompting the user to perform the operation concerning registration. When the imaging unit is set to the continuous shooting mode, the display unit may not display the image for prompting the user to perform the operation concerning registration.

The imaging apparatus may further include a flash, a detecting unit operable to detect ambient light, and a controller operable to control the display unit to switch between displaying and not displaying the image for prompting the user to perform the operation concerning registration in accordance with a detection result by the detecting unit when a shooting operation is performed using the flash.

The controller may control the display unit to display the image for prompting the user to perform the operation concerning registration when the detecting unit determines that ambient light is equal to or higher than a predetermined value. The controller may control the display unit not to display the image for prompting the user to perform the operation concerning registration when the detecting unit determines that ambient light is less than the predetermined value.

In a case where the imaging apparatus further includes a detecting unit operable to detect whether a subject indicated by feature quantity information extracted by the extracting unit is a front of the subject, when the detecting unit detects that the face is the front, a feature quantity information extracted by the extracting unit may be stored in the storing unit as a registration candidate, and when the detecting unit detects that a subject is turned sideways by at least a predetermined amount, the feature quantity information extracted by the extracting unit may not be stored in the storing unit as a registration candidate.

When the imaging unit performs auto-bracketing shooting operation, the display unit may not display the image for prompting the user to perform the operation concerning registration.

According to the above configurations, if the same feature quantity is extracted a predetermined number of times in the recording mode, a image for prompting a user to perform an operation concerning registration is automatically displayed. Therefore, it is possible to register a subject (for example, a face) that is an identification target more easily.

BRIEF DESCRIPTION OF THE DRAWINGS

FIG. 3 is a flowchart showing a method of previously manually registering a face that is an identification target in the first embodiment.

DETAILED DESCRIPTION OF THE PREFERRED EMBODIMENTS

1. First Embodiment 1-1. Summary

An imaging apparatus according to a first embodiment is a digital camera. The digital camera of the first embodiment can identify a face of a subject and register the face of the identified subject therein. The digital camera of the first embodiment can identify a previously registered face from subjects to be shot, and can bring the registered face into focus preferentially. Especially, the digital camera of the first embodiment can automatically display a image for determining whether a face that is extracted the predetermined number of times from shot image data should be registered, and prompts the user to register the face so that the face to be identified can easily be registered.

1-2. Configuration 1-2-1. Electrical Configuration

Figure 1:
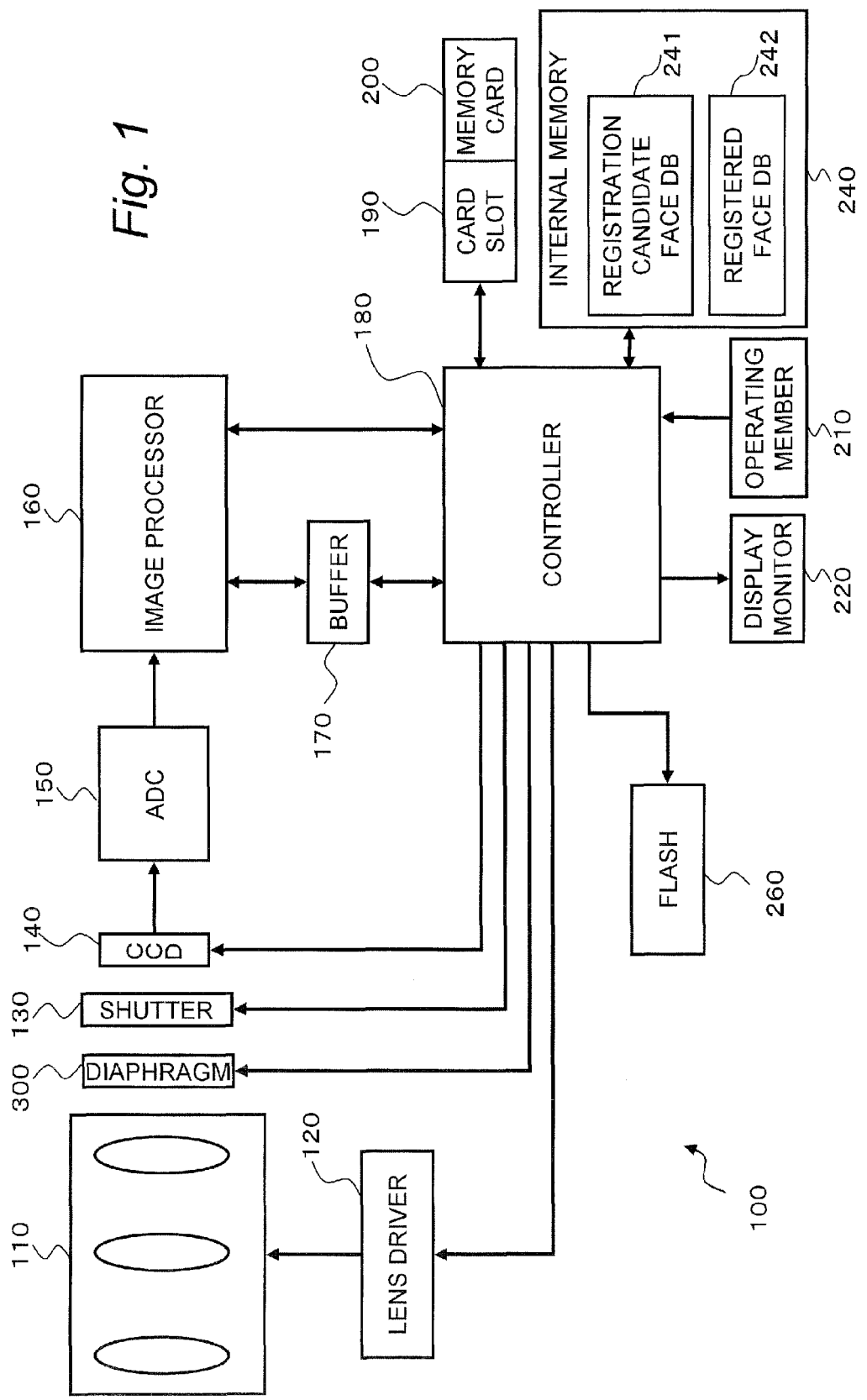
FIG. 1 is a block diagram showing a digital camera of first and second embodiments.

An electrical configuration of the digital camera according to the first embodiment will be described with reference to FIG. 1. FIG. 1 is a block diagram showing a configuration of a digital camera 100. The digital camera 100 captures, by a CCD image sensor 140, a subject image formed by an optical system 110. The optical system 110 includes one or more lenses. Image data generated by the CCD image sensor 140 is variously processed by an image processor 160 and is stored in a memory card 200. The configuration of the digital camera 100 will be described below in detail.

The optical system 110 includes a zoom lens and a focus lens. By moving the zoom lens along an optical axis, a subject image can be zoomed in or out. By moving the focus lens along the optical axis, it is possible to adjust the focus of a subject image.

A lens driver 120 drives various lenses included in the optical system 110. For example, the lens driver 120 is a zoom-motor that drives the zoom lens, or a focus motor that drives the focus lens.

A diaphragm 300 adjusts a size of an opening automatically or in accordance with user's settings to control an amount of transmitted light.

A shutter 130 shuts off light incident through the CCD image sensor 140.

The CCD image sensor 140 captures a subject image formed by the optical system 110 to generate image data. The CCD image sensor 140 performs various operations such as exposure, transmission, and electronic shutter.

An A/D converter 150 converts analogue image data generated by the CCD image sensor 140 into digital image data.

The image processor 160 applies various processes to image data generated by the CCD image sensor 140 to generate image data to be displayed on a display monitor 220 and image data to be stored in the memory card 200. For example, the image processor 160 applies, to image data generated by the CCD image sensor 140, various processes such as gamma correction process, white balance correction process, and scratch correction process. The image processor 160 compresses image data generated by the CCD image sensor 140 in a compression format based on JPEG standard, for example. The image processor 160 can be implemented by DSP (Digital Signal Processor) or a microcomputer.

A controller 180 controls the entire digital camera. The controller 180 can be implemented by a semiconductor device. The controller 180 may be realized by hardware only or a combination of hardware and software. The controller 180 can be implemented by a microcomputer. The controller 180 controls the digital camera 100 in a control mode that includes a recording mode for recording a subject and a facial registration mode for registering manually a face of a subject in advance. In the first embodiment, when a subject is shot in the recording mode, a screen confirming whether a face of the recorded subject should be registered is automatically displayed (details thereof will be described later).

The controller 180 has a function (facial identification function) for detecting a face from an image shown by image data generated by the image processor 160. More specifically, standard eye's positions, nose's position, mouth's position in a human face, and the like are stored in an internal memory 240. The controller 180 determines whether an image shown by the image data generated by the image processor 160 includes a portion having a positional relation that is similar to a positional relation between eyes, a nose, and a mouth stored in the internal memory 240. If the controller 180 determines that the image includes the portion having the similar positional relation, a predetermined range of area around the portion is detected as a face.

The controller 180 includes a function (person identification function) for identifying whether a face of a subject shown by image data generated by the image processor 160 is the same as a face that is previously registered in the internal memory 240. More specifically, the controller 180 detects a face from an image shown by image data generated by the image processor 160. When the controller 180 detects a face, the controller 180 converts, into a numeric value, feature quantity information showing facial features from a positional relation between eye's positions, a nose's position, and a mouth's position, a facial color, a profile of a face, and eyebrow in the face, and extracts the feature quantity information in the numeric value. When the controller 180 extracts facial feature quantity information, the controller 180 determines whether the extracted feature quantity information is similar to facial feature quantity information that is previously registered in the internal memory 240. More specifically, the controller 180 compares a numeric value showing the extracted feature quantity information with a numeric value showing facial feature quantity information that is stored in the internal memory 240 to determine whether the features are similar to each other depending upon whether a difference therebetween falls within a predetermined range. When the controller 180 determines that the features are similar to each other, the controller 180 identifies that the detected face is the same as the face that is previously registered in the internal memory 240. When the controller 180 determines that the features are not similar, the controller 180 identifies that the detected face is different from the face that is previously registered in the internal memory 240.

The controller 180 can recognize brightness around the digital camera by analyzing brightness information of image data that is captured by the CCD image sensor 140.

A buffer 170 functions as a work memory of the image processor 160 and the controller 180. The buffer 170 can be implemented by a DRAM or a ferroelectric memory, for example.

The memory card 200 can be attached to and detached from a card slot 190. The card slot 190 can mechanically and electrically be connected to the memory card 200. The memory card 200 includes a flash memory or a ferroelectric memory therein, and data such as image file generated by the image processor 160 can be stored in the memory card 200.

The internal memory 240 includes a flash memory or a ferroelectric memory. The internal memory 240 stores a control program for controlling the entire digital camera 100, information concerning a positional relation between standard eye's positions, nose's position, and mouth's position in a face used for detecting a face, and information concerning a face that is previously registered for identifying a face, for example. Especially, in the first embodiment, the internal memory 240 stores a registration candidate face database 241 (first database) for collecting feature quantity information of faces which are candidates of automatic registration, and a registered face database 242 (second database) for collecting feature quantity information of faces which are previously registered by manual registration and automatic registration.

An operating member 210 is a generic name of a user interface that receives operation from a user. For example, the operating member 210 may be arrow keys or a determination button for receiving operation from a user.

The display monitor 220 can display an image (through image) shown by image data generated by the CCD image sensor 140, and an image shown by image data that is read from the memory card 200. The display monitor 220 can display various menu images for performing various settings of the digital camera 100.

A flash 260 emits light for irradiating a subject with light. The flash 260 discharges a charged voltage, thereby allowing xenon gas sealed in the flash 260 to emit light. That is, the flash 260 emits light for irradiating a subject with light by discharging a charged voltage.

1-2-2. Correspondence of Terms

The CCD image sensor 140 is one example of an imaging unit. The controller 180 is one example of an extracting unit, a determining unit, and a controller. The internal memory 240 is one example of a storing unit. The display monitor 220 is one example of a display unit.

1-3. Facial Identification Function

As described above, the digital camera 100 includes the facial identification function (person identification function) that is a function for identifying whether a previously registered face and a face of a subject that is to be captured by the CCD image sensor 140 are the same. The digital camera 100 determines whether a registered facial feature quantity and a facial feature quantity included in a captured image are similar to each other. If the digital camera 100 determines that the facial feature quantities are similar to each other, the digital camera 100 determines that the registered face and the captured face are the same.

Figure 2:
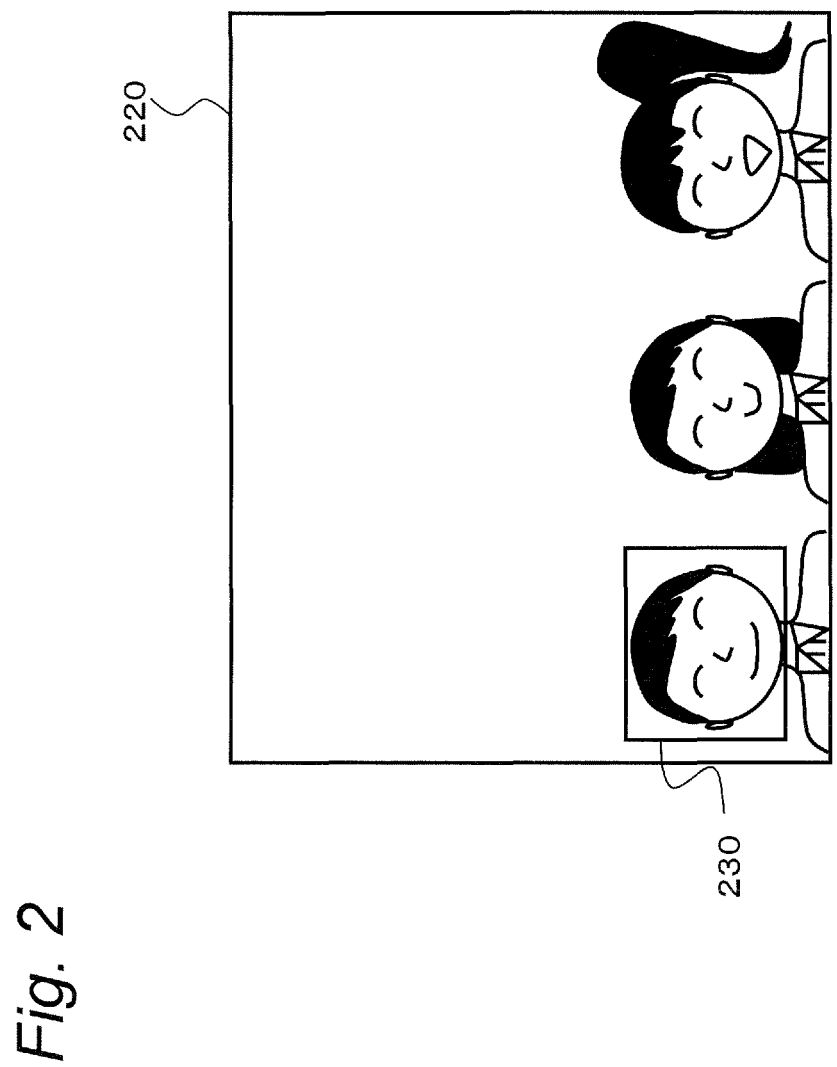
FIG. 2 is a schematic diagram for explaining an example of a shooting operation using a facial identification function.

The digital camera 100 determines whether a registered face exists in the subjects to be captured when recording a subject. When the digital camera 100 determines that there exists a registered face, the digital camera 100 performs operations such as an operation for bringing the registered face into focus preferentially. For example, assuming that a boy shown on the leftmost side in FIG. 2 is previously registered as a target for identification, the display monitor 220 displays a face frame 230 around a face of the boy as a target for identification. When a user performs auto-focus operation in the digital camera 100, the digital camera 100 brings the face of the boy as a target for identification into focus.

With this function, when there is a subject that is desired to be brought into focus preferentially, if a face of the subject is registered in the digital camera 100 previously, it is possible to bring the subject into focus preferentially.

In the digital camera 100, a face as identification target can be registered manually or automatically. Both the methods will be described below.

1-3-1. Manual Registration of Identification Target

Figure 4A:
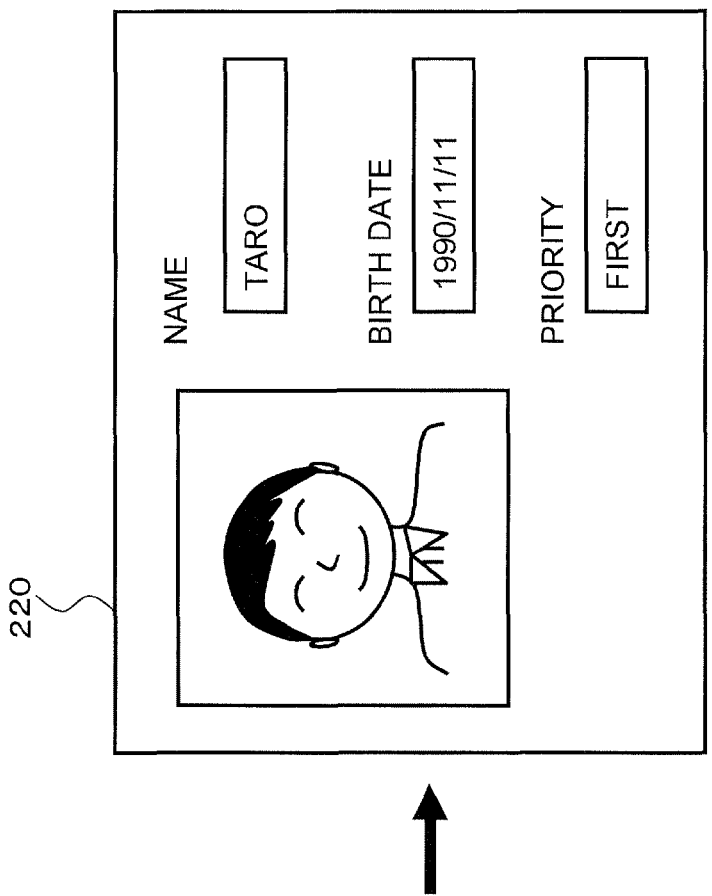
FIGS. 4A and 4B are diagrams showing a display example of a image when a face that is an identification target is previously registered manually.
Figure 4B:
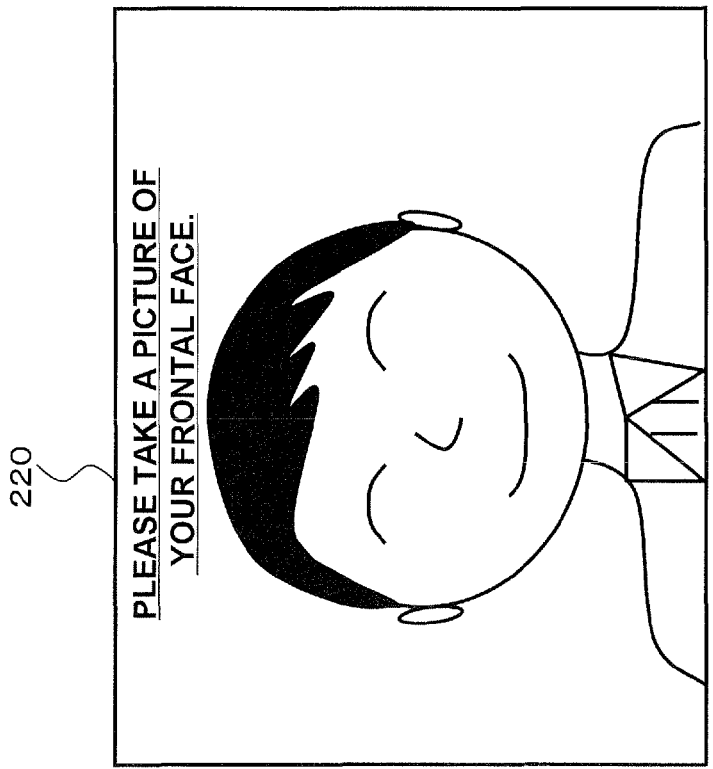

A method for previously manually registering a face as identification target will be described with reference to FIGS. 3, 4A and 4B. FIG. 3 is a flowchart showing the method for previously manually registering a face as identification target. FIGS. 4A and 4B are schematic diagrams for explaining the method for previously manually registering the face as identification target.

When a user operates the operating member 210 to select a facial registration mode for previously registering a face as identification target, the manual facial registration mode is started. The controller 180 of the digital camera 100 starts a mode for recording a face as identification target (S110). When the shooting operation is started in the facial registration mode, the display monitor 220 displays an image as shown in FIG. 4A.

The controller 180 determines whether a face as identification target is shot by the user (S120). The controller 180 is on standby until the user shoots a face as identification target.

When the user shot a face as identification target, the display monitor 220 displays a screen for prompting a user to input various information concerning the identification target to be registered (S130). For example, the display monitor 220 displays a screen for prompting a user to input information concerning a name, birth date, and priority of an identification target, as shown in FIG. 4B. Here, the priority of an identification target is a parameter for determining whether which face should be identified preferentially when the plurality of faces are to be shot in a situation where there are a plurality of previously registered faces.

The controller 180 determines whether a user has input various information (S140). The controller 180 is on standby until the user inputs the various information.

When the various information are inputted, the controller 180 associates the registered various information with the facial feature quantity information, and stores them in the internal memory 240, then completing the facial registration mode.

With this method, a user can register a face to be identified and information concerning a person related to the face into the digital camera 100.

1-3-2. Automatic Registration of Identification Target

Figure 5:
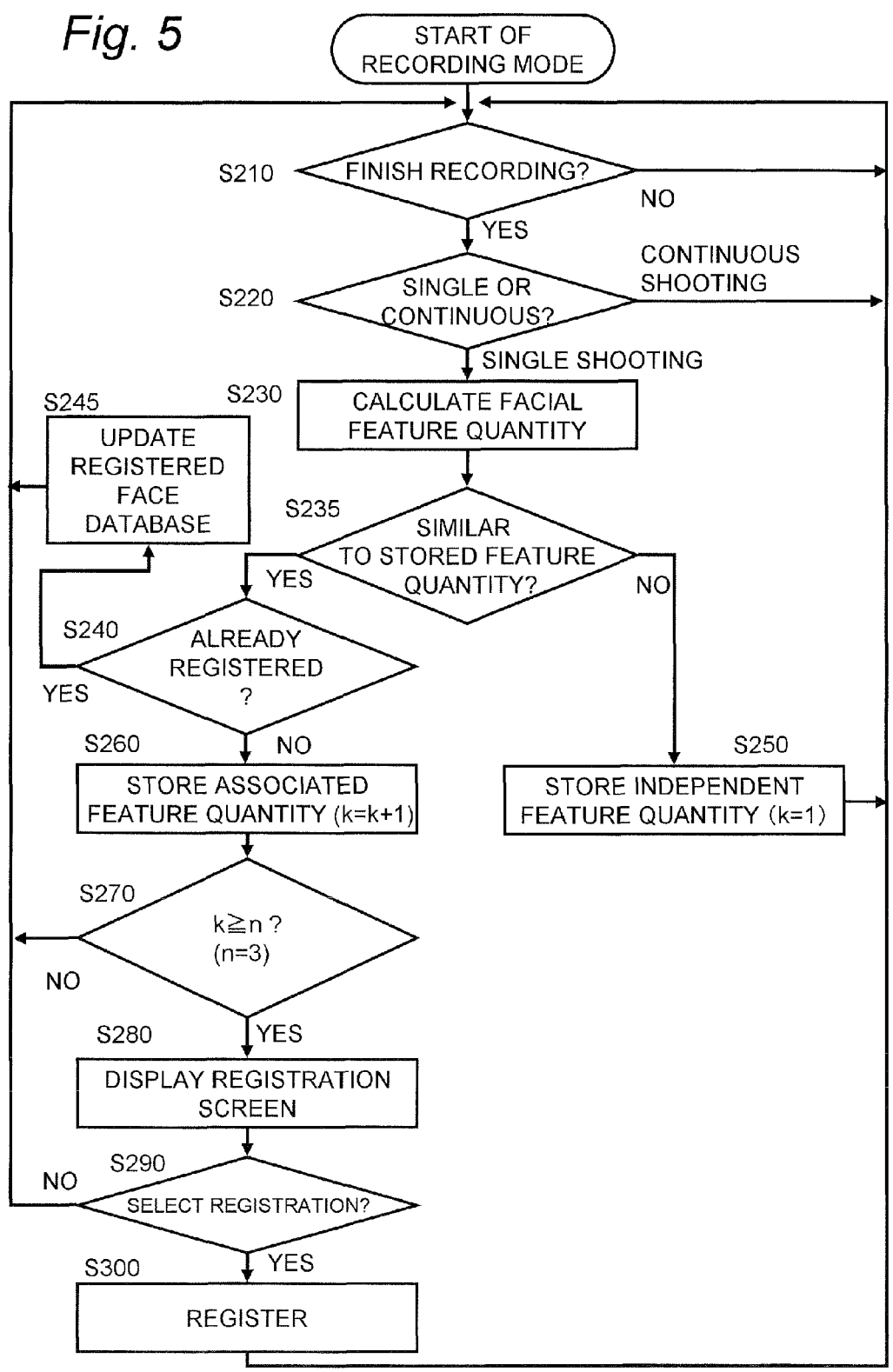
FIG. 5 is a flowchart showing a method of automatically displaying a image for registering an identification target in the first embodiment.
Figure 6:
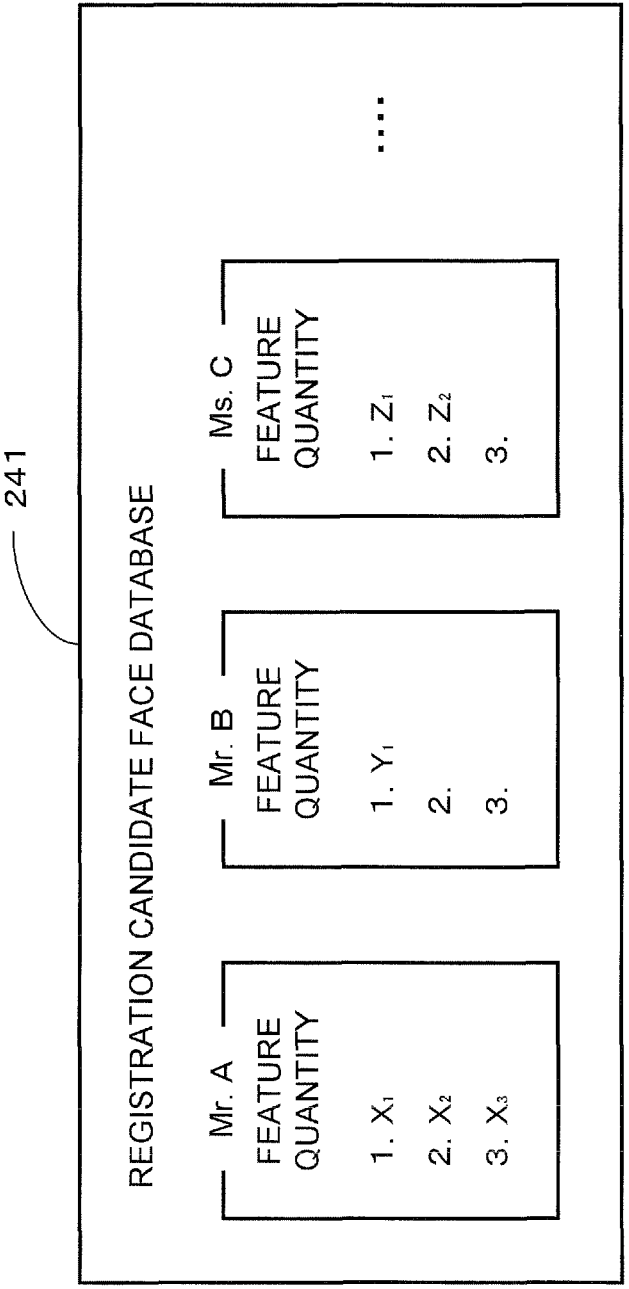
FIG. 6 is a conceptual diagram of feature quantity information of registration candidates.

Next, the method of automatically registering an identification target will be described with reference to FIGS. 5 and 6. FIG. 5 is a flowchart showing the method of automatically registering an identification target. FIG. 6 is a schematic diagram showing registration candidates of an identification target. In the first embodiment, the automatic registration of identification target means that the digital camera 100 is not set into the facial registration mode for registering a face manually and a screen confirming whether a face should be registered with a normal recording mode selected is automatically displayed. In the following description, a term "similar" includes a concept of "the same".

When a user operates the operating member 210 and sets the digital camera 100 into the recording mode, the recording mode is started. When the mode is set to the recording mode, the controller 180 determines whether a shooting operation is performed (S210). The controller 180 is on standby until a user performs the shooting operation.

When the shooting operation is performed, the controller 180 determines whether the shooting operation is performed in a single shooting mode or in a continuous shooting mode (S220). Here, the single shooting mode is a mode in which a shooting operation for a subject is performed once by one recording instruction. The continuous shooting mode is a mode in which the shooting operation for a subject can be performed continuously plural times by one recording instruction.

In the first embodiment, a screen displayed for prompting a user to operate for registration of identification target (automatic display of a screen for registering a face) is not performed in the continuous shooting mode, but is performed only in the single shooting mode. Therefore, When the controller 180 determines that the shooting operation is performed in the continuous shooting mode, the procedure is returned to step S210, and the controller 180 is on standby until a user performs next shooting operation.

When the controller 180 determines that shooting operation is performed in the single shooting mode, the controller 180 extracts a facial feature quantity of a shot subject (S230). At that time, if only one person is shot as a subject, a facial feature quantity of the person is extracted. When a plurality of persons are shot at the same time, the controller 180 extracts a feature quantity of a face of a person that is in focus.

When the facial feature quantity is extracted, the controller 180 determines whether the extracted feature quantity is similar to a feature quantity that is stored in the registration candidate face database 241 (S235).

When it is determined that the feature quantity extracted in step S230 is not similar to the feature quantity that is stored in the registration candidate face database 241 in the internal memory 240 (No in Step S235), the controller 180 does not link the extracted feature quantity with the already stored feature quantity, and stores the extracted feature quantity into the registration candidate face database 241 in the internal memory 240 as an independent feature quantity (S250). Thereafter, the procedure is returned to step S210 and the controller 180 is on standby until a user performs next shooting operation.

When it is determined that the feature quantity extracted in step S230 is similar to the feature quantity stored in the registration candidate face database 241 in the internal memory 240 (Yes in Step 235), the controller 180 determines whether the extracted feature quantity is already registered in the registered face database 242 as identification target (S240). More specifically, it is determined whether a feature quantity similar to the extracted feature quantity is registered in the registered face database 242.

If the extracted feature quantity has already been registered in the registered face database 242 as identification target (Yes at step S240), the registered face database 242 is updated with the extracted feature quantity (S245). At that time, the registered feature quantity may be replaced by the extracted feature quantity, or an average value between the registered feature quantity and the extracted feature quantity may be set as a new feature quantity. When the extracted feature quantity has already been registered in the registered face database 242 as identification target, it may not always be necessary to update the registered face database 242 like step S245.

When the extracted feature quantity is not already registered in the registered face database 242 as identification target (No at step S240), the controller 180 links the extracted feature quantity with the feature quantity stored in the internal memory 240, and registers the extracted feature quantity in the registration candidate face database 241 (S260). At that time, the controller 180 counts the number (k) of the feature quantity that is stored in association with the registered feature quantity.

FIG. 6 shows an example of a configuration of the registration candidate face database 241 in the internal memory 240. In FIG. 6, feature quantities $X_1$, $X_2$, and $X_3$ are similar to each other. Feature quantities $Z_1$ and $Z_2$ are similar to each other. There is no similarity relation between other feature quantities (e.g., $X_1$ and $Y_1$, and $X_1$ and $Z_1$). Similar feature quantities are linked with each other and stored. For example, $X_1$, $X_2$, and $X_3$ are linked with each other and stored. This is because it is conceived that $X_1$, $X_2$, and $X_3$ are feature quantities extracted when a face of the same person A is shot. Further, $Y_1$ is not linked with any of other feature quantities. This is because that $Y_1$ is a feature quantity that is extracted when a face of a person B is shot, but the face of the person B is shot only once. Further, $Z_1$ and $Z_2$ are linked with each other and stored. This is because it is conceived that $Z_1$ and $Z_2$ are feature quantities that are extracted when the same person C is shot. In this manner, if the extracted facial feature quantity is similar to other feature quantities, the extracted facial feature quantity is linked with the similar feature quantities and stored. At that time, the controller 180 counts feature quantities that are stored in association with each other. For example, when a subject that is shot this time is the person A and the feature quantity $X_3$ is extracted, the controller 180 links the feature quantity $X_3$ with the feature quantity $X_1$ and the feature quantity $X_2$, and stores the feature quantity $X_3$ in the registration candidate face database 241 of the internal memory 240, and counts that the feature quantity linked with the feature quantity X is a third feature quantity.

In the first embodiment, When the feature quantities that are stored in associated state exceed a predetermined number n, a screen for confirming a user whether a face of a subject shown by that feature quantity should be registered is automatically displayed. That is, as in step S270 in FIG. 5, the controller 180 determines whether the number k of the feature quantitys that are stored in association with each other is not less than the predetermined number n (S270). In the first embodiment, the predetermined number n is 3.

If the controller 180 determined that the number k of the feature quantities is less than the predetermined number n (k<n), the procedure is returned to step S210, and the controller 180 is on standby until a user performs next shooting operation.

Figure 7:
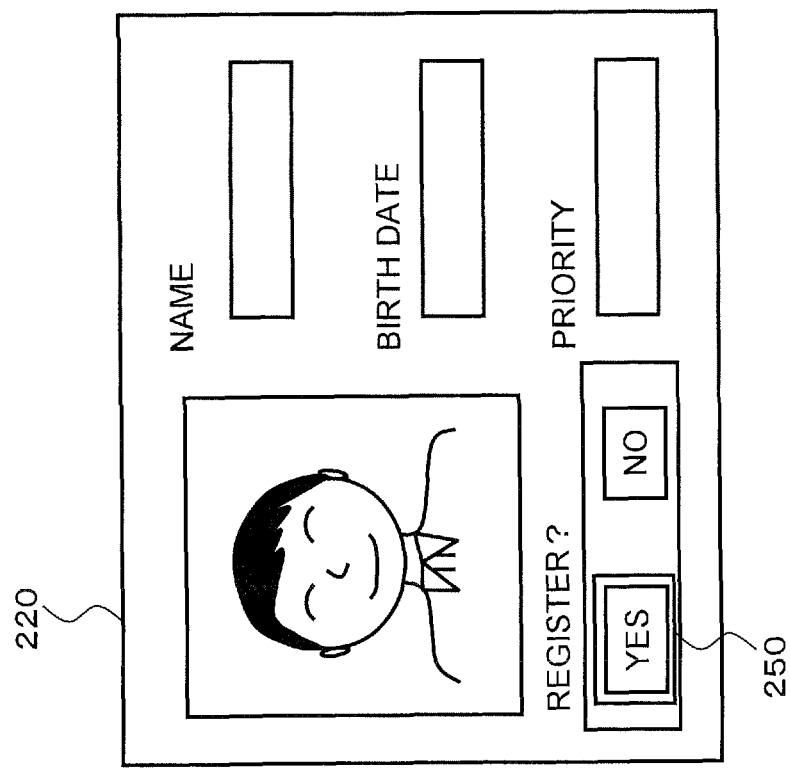
FIG. 7 is a diagram showing a image for prompting a user to select whether an identification target should be registered.

If the controller 180 determined that the number k of the feature quantities is not less than the predetermined number n (k≥n), the display monitor 220 automatically displays the screen for confirming a user whether a face of a subject shown by feature quantities of the predetermined number n or more should be registered (S280). For example, a registration screen as shown in FIG. 7 is displayed. In an example shown in FIG. 7, a picture of a face that is captured recently, that is, a picture of a face that is stored in association with the third feature quantity (e.g., $X_3$) is displayed.

When the registration screen is displayed, the controller 180 determines whether a user has input answer as to whether the face should be registered (S290). That is, the controller 180 is on standby until a user selects whether the face should be registered. The user can select whether the face displayed on the registration screen should be registered by operating the operating member 210 and moving a selection frame 250 shown in FIG. 7. Here, if a user selects "Yes", the face can be registered as identification target, and if the user selects "No", the user can refuse the registration of the face as identification target. Before the user selects "Yes" or "No", information such as a name, a birth date, and priority may be inputted.

Referring back to FIG. 5, if a user selects that the face should be registered, the controller 180 registers a face displayed on the registration screen in the registered face database 242 as a face of identification target in the recording mode from then on (S300). For example, an average value (average value of $X_1$, $X_2$, and $X_3$ in the case of the person A in FIG. 6) of facial feature quantities displayed on the registration screen is registered in the registered face database 242 in association with a face image, and the feature quantities (e.g., $X_1$, $X_2$, and $X_3$) are deleted from the registration candidate face database 241. With this, automatic registration of identification target is completed. The controller 180 defines a subject (face) that is identified n times or more as identification target from then on. It is noted that either one of three registration candidates, instead of the average value of the facial feature quantity, may be registered to the registered face database 242 in association with the face image.

If a user selects that the face should not be registered, procedure is returned to step S210, and the controller 180 is on standby until a user performs next shooting operation. At that time, the controller 180 may reset k that is the number of identification to 0 (k=0). With this, it is possible to avoid a case where the controller 180 immediately again asks a user whether registration should be performed for a face of a subject that the user refused to register once.

1-4. Summary

According to the digital camera 100 of the first embodiment, if a feature quantity showing the same face is extracted the predetermined number of times at the time of the recording mode, the digital camera 100 automatically displays a screen ("registration screen" as shown in FIG. 7) for prompting a user to operate for registering the face as identification target from then on. With this, to register identification target, a user need not set the digital camera 100 into the manual facial registration mode and newly shoot a picture. According to the first embodiment, only an image of a subject that is shot frequently can efficiently be registered as identification target.

If a feature quantity that shows the same face is extracted the predetermined number of times, the digital camera 100 of the first embodiment displays a screen for prompting a user to input whether the face should be registered as identification target from then on. That is, the user can determine whether the face should actually be registered. Therefore, the digital camera 100 of the first embodiment can prevent a case where a face of a subject that the user does not desired to register as identification target is registered without confirming.

If a feature quantity that shows the same face is extracted the predetermined number of times, the digital camera 100 of the first embodiment displays a screen for prompting a user to input other various information for registering that face as identification target from then on. With this, when a face is identified using the feature quantity thereafter, it is possible to realize a convenient function using other various information. For example, when a name is inputted as other information, it is possible to display a name of an identification target when the identification target is displayed in a through image.

In the continuous shooting mode, a plurality of images can be captured instantaneously. If a registration screen is displayed on the display monitor 220 whenever one of the images is captured, usability of operation is deteriorated. In the digital camera 100 of the first embodiment, when identification target is identified the predetermined number of times in the single shooting mode, a screen display for prompting a user to operate for registering the face as identification target from then on (display of registration screen) is performed. However, in the continuous shooting mode, a feature quantity of the identification target is not extracted and the registration screen is not displayed. This can prevent a registration screen of a face from being displayed whenever the shooting operation is performed at the time of continuous shooting. With this, usability of operation is enhanced.

2. Second Embodiment

A digital camera 100 of a second embodiment determines whether a facial feature quantity of a subject should be extracted in accordance with ambient light when the flash is emitted at the time of the recording mode. When the ambient light is bright, an extracted facial feature quantity of a subject does not vary almost at all between a case where the flash is emitted and a case where the flash is not emitted. However, when the ambient light is dark, an extracted facial feature quantity of a subject tends to vary between a case where the flash is emitted and a case where the flash is not emitted, and there is a possibility that a feature quantity may be different even if the person is the same. Therefore, if the flash is emitted when the ambient light is dark, a facial feature quantity of a subject is not extracted. With this, the same or similar feature quantity is extracted for the same person. Since the configuration of the digital camera 100 of the second embodiment is the same as that of the first embodiment, description of the common configuration will not be given.

2-1. Automatic Registration of Identification Target

Figure 8:
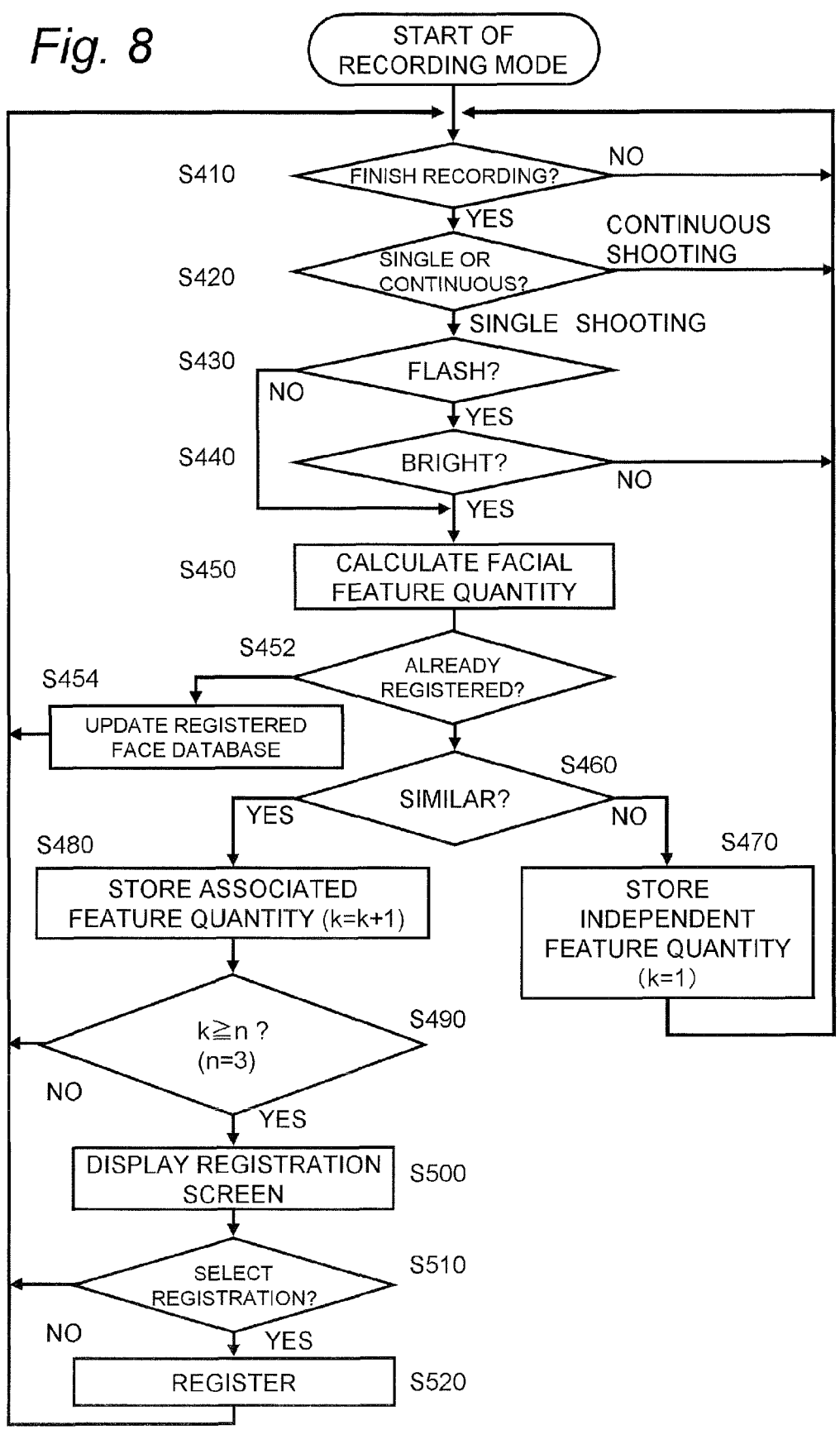
FIG. 8 is a flowchart showing a method of automatically displaying a image for registering an identification target in the second embodiment.

A method of automatically registering an identification target by the digital camera 100 of the second embodiment will be described with reference to FIG. 8. FIG. 8 is a flowchart showing the method of the second embodiment of automatically registering an identification target. FIG. 8 is different from FIG. 5 of the first embodiment in that steps S430 and S440 are added. In FIG. 8, since steps S410 to step S520 except steps S430 and S440 are the same as steps S210 to S300 in FIG. 5, detailed description thereof will not be given. Steps S430 and S440 will be described below.

If the controller 180 determines that a shooting operation is performed in the single shooting mode in step S420, the controller 180 determines whether the flash 260 emits light at the time of the shooting operation (S430). If the controller 180 determines that the flash 260 emits light, the controller 180 determines whether the ambient light is equal to or higher than a predetermined value (S440). The controller 180 can recognize the ambient light by analyzing brightness information of a through image that is captured by the CCD image sensor 140 before a record image is shot. If the controller 180 determines that the brightness is less than the predetermined value (No at step S440), the procedure is returned to step S410, and the controller 180 is on standby until a user performs next shooting operation.

If the controller 180 determines that the brightness is equal to or higher than the predetermined value (Yes at step S440), the controller 180 extracts the facial feature quantity of the shot subject (S450). If the controller 180 determines that the flash 260 does not emit light (No at S430), the controller 180 extracts a facial feature quantity of the shot subject (S450). Thereafter, the controller 180 performs the same control as that in steps S240 to S300 in FIG. 5 of the digital camera 100 of the first embodiment (steps S460 to S520).

When the digital camera 100 of the second embodiment shoots an image while emitting light from the flash 260, a facial feature quantity of a subject is not extracted when the ambient light is not equal to or higher than a predetermined value. That is, a screen for prompting a user to operate for registering a face of a subject as an identification target is not displayed. A reason thereof will be described below.

The digital camera 100 of the second embodiment makes the flash 260 emit light when recording a subject in some cases. The digital camera 100 extracts a facial feature quantity shown in a through image to identify whether a face captured by the CCD image sensor 140 is the same as a face that is registered as an identification target. However, the digital camera 100 does not make the flash 260 emit light when capturing a through image. When ambient light is bright, the digital camera 100 can capture an image that is not varied so much between a case where an image is captured while emitting light from the flash 260 and a case where an image is captured while not emitting light from the flash 260. When ambient light is dark, the digital camera 100 captures totally different images between a case where an image is captured while emitting light from the flash 260 and a case where an image is captured while not emitting light from the flash 260. Therefore, the following problem arises.

When the flash 260 emits light and the same face is captured a predetermined number of times in a state where the ambient light is less than the predetermined value, if the face is registered as an identification target from then on, it leads a facial feature quantity shown by a bright image captured while emitting light from the flash 260 is registered as an identification target from then on. In this case, even if a through image of the same face as a registered face is captured in a state where the ambient light is less than the predetermined value, the face of the through image is much darker than a face captured while emitting light from the flash 260. Therefore, the digital camera 100 cannot extract a feature quantity that is similar to a registered feature quantity from the face of the through image. As a result, a face that was just registered cannot be identified in the next instant by the digital camera 100. If such phenomenon happens, a user is confused and feels as if the digital camera 100 is out of order.

When the flash 260 emits light and the same face is captured the predetermined number of times in a state where the ambient light is equal to or higher than the predetermined value, even if the face is registered as an identification target from then on, a possibility that the digital camera 100 can extract a feature quantity that is similar to a registered feature quantity from the same face shown by the through image is high.

When the digital camera 100 of the second embodiment shoots an image while emitting light from the flash 260, if the ambient light is not equal to or higher than the predetermined value, the digital camera 100 does not display the screen for prompting a user to operate for registering the face as an identification target from then on. With this, it is possible to avoid the above-described situation.

In this embodiment, when recoding with a flash is done and the ambient light is less than the predetermined value, an screen (registration screen) for prompting a user to operate for registering a face of a subject as an identification target is not displayed. However, not limited to this, the registration screen may not be displayed as long as recording with a flash is done, independently on the ambient light. This is because look of picture may be changed even though the ambient light is bright.

3. Other Embodiment

The first and second embodiments have been described as embodiments of the present configuration. However, the configuration is not limited to these embodiments. For example, the following embodiment may be employed.

In the first and second embodiments, a feature quantity of a subject is not extracted and the number of times of identification of the subject is not counted in the continuous shooting mode. However, the present configuration is not limited to such embodiments. For example, it is possible to employ such a configuration that a feature quantity of a subject is extracted also in the continuous shooting mode, but the registration screen is not displayed even if the number k of the feature quantities that are stored in association with each other exceeds the predetermined number n. When a plurality of image data sets are continuously captured in the continuous shooting mode, a feature quantity may be extracted and stored from one of the image data sets, and the count of the number k of the feature quantities may be increased only by 1. With this, a subject that is frequently shot can easily be registered as an identification target even when shooting in the continuous shooting mode.

In the first and second embodiments, a name or the like can be inputted when a face is registered as in the registration screen shown in FIG. 7, but the registration screen is not limited thereto. For example, only a face picture and selection buttons "Yes" and "No" for confirming whether registration are necessary may be displayed on a registration screen that is displayed when a feature quantity showing the same face is extracted the predetermined number of times, and after registration ("Yes") is selected, a screen for inputting a name or the like may be displayed.

In the first and second embodiments, when the same face is shot the predetermined number of times, the digital camera 100 displays the screen for prompting a user to select whether the face is registered as an identification target, but the present configuration is not limited to this embodiment. For example, when a similar feature quantity that is extracted n-times or more, a face that is shown by the feature quantity may automatically be registered as an identification target. In this case, a screen for prompting a user to select whether a face should be registered as an identification target may not be displayed, and only a screen for prompting the user to input information such as a name and birth date concerning a face shown by the feature quantity may be displayed.

The number of persons that can be registered in the registration candidate face database 241 and/or the registered face database 242 as an identification target is not limited unless a capacity of the internal memory 240 is not exceeded. In this case, if the capacity of the internal memory 240 is exceeded, registration into the registration candidate face database 241 and/or the registered face database 242 may automatically be prohibited. For example, the processing in steps S220 to S300 shown in FIG. 5 may not be performed. The number of persons that can be registered in the registration candidate face database 241 and/or the registered face database 242 as an identification target may previously be limited to a predetermined number. When the number of persons that can be registered is previously limited to the predetermined number and if the number exceeds the predetermined number, registration of the persons that is registered as identification target may automatically be canceled in chronological order. With this, it is possible to prevent the internal memory 240 from being filled with registration of the identification target, and a face that is frequently shot as a subject can be registered as an identification target.

In the first or second embodiment, when a feature quantity that is the same as or similar to a feature quantity stored in the registered face database 242 is extracted, the extracted feature quantity is not registered in the registration candidate face database 241. However, the present configuration is not limited to this method, and the extracted feature quantity may be registered in the registration candidate face database 241 even when a feature quantity that is the same as or similar to a feature quantity stored in the registered face database 242 is extracted. In this case, however, even when the number of feature quantities that are stored in the registered face database 242 exceeds the predetermined number n, the registration screen is not displayed on the display monitor 220. With this, since the screen for prompting a user to register is not displayed again for persons that are already registered, a case where the same face is registered a plurality of times can be avoided. With this, it is possible to prevent the capacity of the internal memory 240 from being wasted. Even when a feature quantity that is the same as or similar to a feature quantity stored in the registered face database 242 is extracted, the feature quantity may be registered in the registration candidate face database 241, and when the number of registered feature quantities exceeds the predetermined number n, the registration screen may automatically be displayed.

According to the imaging apparatus of the first or second embodiment, the registration screen for prompting a user to register a feature quantity as an identification target is displayed when the number of feature quantities that are stored in associated state reaches the predetermined number n (e.g., n=3). However, the present configuration is not limited to this embodiment A screen for prompting a user to register may be displayed whenever the number of extractions of feature quantity information of the same face as a face shown by the feature quantity information stored in the internal memory 240 reaches the predetermined number. For example, the number of feature quantities that are stored in the internal memory 240 is limited to 1, the number of extractions of feature quantities that are identified as the same face is counted, and when the number of counts reaches a predetermined number, a screen for prompting a user to register the same as an identification target may be displayed. In this case, feature quantity information that is regarded as the same may be corrected based on newly extracted feature quantity information whenever feature quantity information is extracted.

In the imaging apparatus of the first or second embodiment, the predetermined number n is set to 3. However, the present configuration is not limited to these embodiments. The predetermined number n may be any number. For example, the predetermined number n may be 2 or 4.

According to the imaging apparatus of the first or second embodiment, when an identification target is automatically registered, an image of a face that was captured at third time is registered in association with a feature quantity. However, the present configuration is not limited to this embodiment. An image of arbitrary capture timing may be registered in association with a feature quantity.

For example, an image that was captured at the second time or the first time may be used.

According to the imaging apparatus of the first or second embodiment, when the shooting operation that was performed while extracting a similar feature quantity from subject images reaches a predetermined number, a screen for prompting a user to select whether a face shown by the extracted similar feature quantity should be registered as an identification target from then on is displayed. However, the present configuration is not limited to this embodiment. For example, when a face shown by the similar feature quantity may automatically be brought into focus and shot the predetermined number of times, a screen for prompting a user to select whether a face shown by the extracted similar feature quantity should be registered as an identification target from then on may be displayed. If a similar feature quantity is extracted the predetermined number of times within a predetermined period when a through image is displayed on the display monitor 220, a screen for prompting a user to select a face shown by the extracted similar feature quantity should be registered as an identification target from then on may be displayed. If a similar feature quantity is extracted the predetermined number of times within a predetermined period when moving image is recorded, a screen for prompting a user to select whether a face shown by the extracted similar feature quantity should be registered as an identification target from then on may be displayed.

In the first or second embodiment, when a plurality of subjects are shot at the same time, a facial feature quantity of a person that is brought into focus is extracted. However, facial feature quantity of a plurality of subjects may be extracted at the same time, and processing shown in FIG. 5 or 8 may be performed.

According to the imaging apparatus of the first or second embodiment, ambient light of the digital camera is recognized by analyzing brightness information of image data that is captured by the CCD image sensor 140. However, the present configuration is not limited to this embodiment only if ambient light can be detected. For example, the digital camera may include a special sensor for detecting the amount of ambient light.

According to the imaging apparatus of the first or second embodiment, when similar feature quantity information is extracted the predetermined number of times, a face shown by the feature quantity information is registered as an identification target. However, it is not always necessary to control in this manner. For example, the controller 180 may detect whether a face of a subject faces front, and when the detected face turns sideways by a predetermined amount or more from the front, the feature quantity information may not be registered as a registration candidate of the identification target. A merit of this configuration will be described below. Even if a face facing front is same as a face turning sideways, feature quantity information sets thereof tends to be not similar in many cases. Therefore, when not only a face facing front but also a face turning sideways is included in the registration candidate, there is an adverse possibility that a plurality of faces which are of the same person but have different facing directions are registered as subjects to be identified. It is detected whether a face of a subject faces front, and when the face turns sideways by a predetermined amount or more, its feature quantity information is not registered as a registration candidate of an identification target. With this, it is possible to avoid the above-described case. In cases where the detected face inclines vertically, the feature quantity may not be registered as registration target of identification target. In short, a face that is not a front of the face may not be registered. Further when the detected face is not the front, the detected face may be corrected to be the front of the face (or the front of the face may be estimated from the detected face), and the feature quantity may be extracted based on an image of the corrected (estimated) face.

According to the imaging apparatus of the first or second embodiment, even if a facial feature quantity is extracted when a shooting operation is performed in a continuous shooting mode, this is not counted as an extraction number of feature quantity. However, the extraction number of feature quantity may not be counted when a facial feature quantity is extracted not only when the continuous shooting mode is performed but also an auto-bracketing shooting is performed. With this, it is possible to avoid a case where extraction of a feature quantity is counted a plurality of times in one recording operation or a plurality of shooting operations that are performed instantaneously and registration image is frequently displayed on the display monitor.

Although the CCD image sensor 140 is described as imaging unit in the first or second embodiment, the present configuration is not limited to these embodiments. For example, the imaging unit may be a CMOS image sensor or an NMOS image sensor.

In the first and second embodiments, the image processor 160 and the controller 180 may be one semiconductor chip or may be independent semiconductor chips.

In the first or second embodiment, it is determined whether the subject is registered based on whether the face of the subject is same. However, a unit to be identified which is used for determining whether the registration is done may not be a face. An object satisfying a predetermined condition may be extracted from an image, and it may be determined whether the registration of the object is done by determining whether feature of the extracted object is the same feature which is registered. This enables determination as to whether the registration is done for animals or things in addition to human beings.

Further, in the first or second embodiment, it may be configured not to extract the feature quantity when the recording mode is a specific recording mode. The specific recording mode includes, for example, image effect mode which can remove wrinkles, process facial color, and/or process facial contour.

Although the controller 180 detects and identifies a face in the first or second embodiment, the present configuration is not limited to these embodiments. For example, a chip that detects and identifies a face may be a chip different from the controller 180. A chip that detects a face and a chip that identifies a face may be independent chips.

Although the description has been made in connection with specified embodiments thereof, many other modifications, corrections and applications are apparent to those skilled in the art. Therefore, the present embodiment is not limited by the disclosure provided herein but limited only to the scope of the appended claims. The present disclosure relates to subject matter contained in Japanese Patent Application No. 2009-013998, filed on Jan. 26, 2009 and Japanese Patent Application No. 2009-034970, filed on Feb. 18, 2009 which are expressly incorporated herein by reference in its entirety.

Industrial Applicability

The present embodiment has an effect that a face that is an identification target can be registered more easily, and the present embodiment can be applied to an imaging apparatus such as a digital still camera and a digital video camera, and a cell-phone having a camera function.

What is claimed is:

1. An imaging apparatus which can be set to a single shooting mode and a continuous shooting mode, comprising:
   an imaging unit operable to capture a subject to generate image data;
   an extracting unit operable to extract feature quantity information indicative of a feature of the subject from the image data generated by the imaging unit;
   a storing unit operable to store the feature quantity information extracted by the extracting unit as a registration candidate;
   a determining unit operable to determine whether a subject indicated by the feature quantity information extracted by the extracting unit is a same subject indicated by the feature quantity information stored in the storing unit as the registration candidate; and
   a display unit operable to display a screen for prompting a user with a user's operation concerning registration, in accordance with number of times the determining unit determines that the subject indicated by the feature quantity information extracted by the extracting unit is the same subject indicated by the feature quantity information stored in the storing unit as the registration candidate, wherein
   the determining unit varies a method for counting number of times the determining unit determines that the subject indicated by the feature quantity information extracted by the extracting unit is the same subject indicated by the feature quantity information stored in the storing unit as the registration candidate, according to the single shooting mode or the continuous shooting mode the imaging apparatus is set to.

2. The imaging apparatus according to claim 1, wherein the screen for prompting the user's operation concerning registration is a screen for allowing the user to select whether information indicating a subject that is determined to be the same subject indicated by the feature quantity information stored in the storing unit as the registration candidate should be registered.

3. The imaging apparatus according to claim 1, wherein the screen for prompting the user's operation concerning registration is a screen for allowing the user to input information concerning a subject that is determined to be the same subject indicated by the feature quantity information stored in the storing unit as the registration candidate.

4. The imaging apparatus according to claim 1, wherein when the imaging apparatus is set to the single shooting mode, the extracting unit extracts the feature quantity information from each image data generated by the imaging unit, and
   when the imaging apparatus is set to the continuous shooting mode, the extracting unit extracts the feature quantity information from a part of a plurality of image data continuously generated by the imaging unit.

5. The imaging apparatus according to claim 1, wherein when the imaging apparatus is set to the single shooting mode, the extracting unit extracts the feature quantity information from each image data generated by the imaging unit, and
   when the imaging apparatus is set to the continuous shooting mode, the extracting unit does not extract the feature quantity information from a plurality of image data continuously generated by the imaging unit.

6. The imaging apparatus according to claim 1, wherein when the imaging apparatus is set to the single shooting mode, the extracting unit extracts the feature quantity information from each image data generated by the imaging unit, and
   when the imaging apparatus is set to the continuous shooting mode, the extracting unit extracts the feature quantity information from one from among a plurality image data continuously generated by the imaging unit.

7. The imaging apparatus according to claim 1, further comprising:
   a flash;
   a detecting unit operable to detect ambient light; and
   a controller operable to control the display unit to switch between displaying and not displaying the screen for prompting the user's operation concerning registration in accordance with the detection result by the detecting unit when a shooting operation is performed using the flash.

8. The imaging apparatus according to claim 7, wherein the controller controls the display unit to display the screen for prompting the user's operation concerning registration when the detecting unit determines that the ambient light is at least equal to a predetermined value, and
   the controller controls the display unit not to display the screen for prompting the user's operation concerning registration when the detecting unit determines that the ambient light is less than the predetermined value.

9. The imaging apparatus according to claim 1, further comprising:
   a detecting unit operable to detect whether a subject indicated by feature quantity information extracted by the extracting unit is a front of the subject, wherein
   when the detecting unit detects that the subject is the front, a feature quantity information extracted by the extracting unit is stored in the storing unit as a registration candidate, and
   when the detecting unit detects that the subject is turned sideways by at least a predetermined amount from the front, the feature quantity information extracted by the extracting unit is not stored in the storing unit as a registration candidate.

10. The imaging apparatus according to claim 1, wherein when the imaging apparatus performs an auto-bracketing shooting operation, the extracting unit extracts the feature quantity information from a part of a plurality of image data continuously generated by the imaging unit by the auto-bracketing shooting operation.

11. The imaging apparatus according to claim 5, wherein when the imaging apparatus performs an auto-bracketing shooting operation, the extracting unit does not extract the feature quantity information from a plurality of image data continuously generated by the imaging unit by the auto-bracketing shooting operation.

12. The imaging apparatus according to claim 6, wherein when the imaging apparatus performs an auto-bracketing shooting operation, the extracting unit extracts the feature quantity information from one from among a plurality of image data continuously generated by the imaging unit by the auto-bracketing shooting operation.

13. An imaging apparatus which can identify a specific subject registered as identification target and can be set to a continuous shooting mode, comprising:
an imaging unit;
a counter operable to count a number of times that an identification subject is shot by the imaging unit; and
a display unit operable to display a screen for prompting a user with a user's operation concerning registration of a subject as identification target, in accordance with the number of times counted by the counter, wherein
when the imaging apparatus is set to the continuous shooting mode, the counter increases the number of times counted only by one when the identification subject is continuously shot plural number of times by the imaging unit.

14. An imaging apparatus which can identify a specific subject registered as identification target and can be set to a continuous shooting mode, comprising:
an imaging unit;
a counter operable to count a number of times that an identification subject is shot by the imaging unit; and
a display unit operable to display a screen for prompting a user with a user's operation concerning registration of a subject as identification target, in accordance with the number of times counted by the counter, wherein
when the imaging apparatus is set to the continuous shooting mode, the counter does not increase the number of times counted when the identification subject is continuously shot plural number of times by the imaging unit.

15. The imaging apparatus according to claim 13, wherein the subject is a human face.

16. The imaging apparatus according to claim 14, wherein the subject is a human face.

17. The imaging apparatus according to claim 15, wherein the screen for prompting the user's operation concerning registration is a screen for allowing the user to select whether information indicating the subject that is shot plural number of times should be registered.

18. The imaging apparatus according to claim 16, wherein the screen for prompting the user's operation concerning registration is a screen for allowing the user to input information concerning the subject that is shot plural number of times.

19. The imaging apparatus according to claim 17, further comprising:
a flash;
a detecting unit operable to detect ambient light; and
a controller operable to control the display unit to switch between displaying and not displaying the screen for prompting the user's operation concerning registration in accordance with the detection result by the detecting unit when a shooting operation is performed using the flash.

20. The imaging apparatus according to claim 18, further comprising:
a flash;
a detecting unit operable to detect ambient light; and
a controller operable to control the display unit to switch between displaying and not displaying the screen for prompting the user's operation concerning registration in accordance with the detection result by the detecting unit when a shooting operation is performed using the flash.

21. An imaging apparatus which can identify a specific subject registered as identification target, comprising:
an imaging unit; and
a display unit operable to display a screen for prompting a user with a user's operation concerning registration of a subject as identification target, in accordance with the subject is shot by the imaging unit.

22. An imaging apparatus which can identify a specific subject registered as identification target and can perform an auto-bracketing shooting operation, comprising:
an imaging unit;
a counter operable to count a number of times that an identification subject is shot by the imaging unit; and
a display unit operable to display a screen for prompting a user with a user's operation concerning registration of a subject as identification target, in accordance with the number of times counted by the counter, wherein
when the imaging apparatus performs the auto-bracketing shooting operation, the counter increases the number of times counted only by one when the identification subject is continuously shot plural number of times by the imaging unit.

23. An imaging apparatus which can identify a specific subject registered as identification target and can perform an auto-bracketing shooting operation, comprising:
an imaging unit;
a counter operable to count a number of times that an identification subject is shot by the imaging unit; and
a display unit operable to display a screen for prompting a user with a user's operation concerning registration of a subject as identification target, in accordance with the number of times counted by the counter, wherein
when the imaging apparatus performs an auto-bracketing shooting operation, the counter does not increase the number of times counted when the identification subject is continuously shot plural number of times by the imaging unit.

24. An imaging apparatus which can identify a specific subject registered as identification target, comprising:
an imaging unit;
a counter operable to count a number of times that an identification subject is shot by the imaging unit; and
a display unit operable to display a screen for prompting a user with a user's operation concerning registration of a subject as identification target, in accordance with the number of times counted by the counter, wherein
after the display unit displayed the display for prompting the user with the user's operation concerning registration of the subject as identification target, when the user's operation is not done by the user, the counter resets the number of times counted.

* * * * *